Patented Sept. 27, 1949

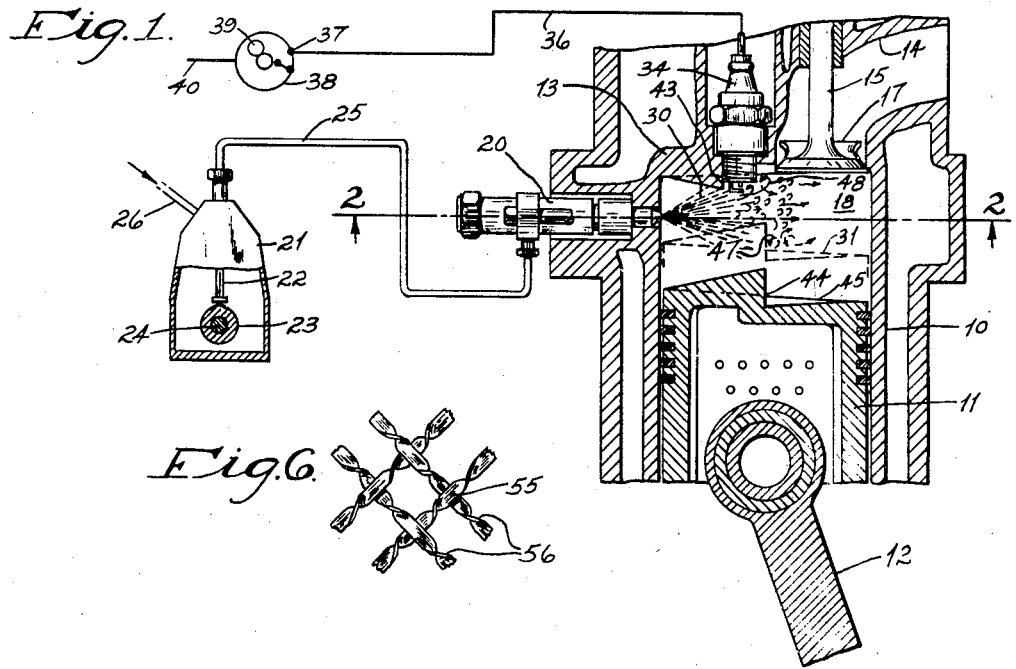
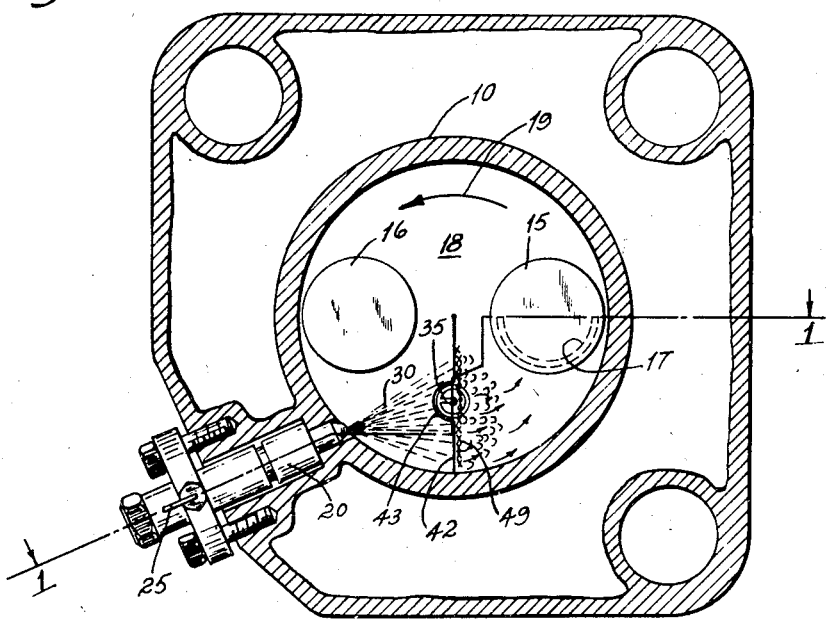

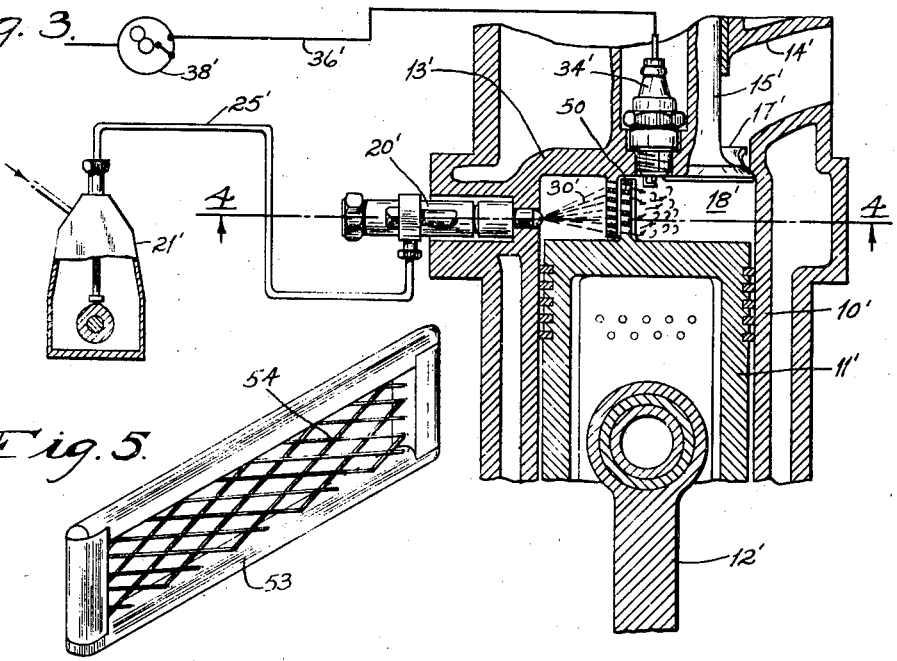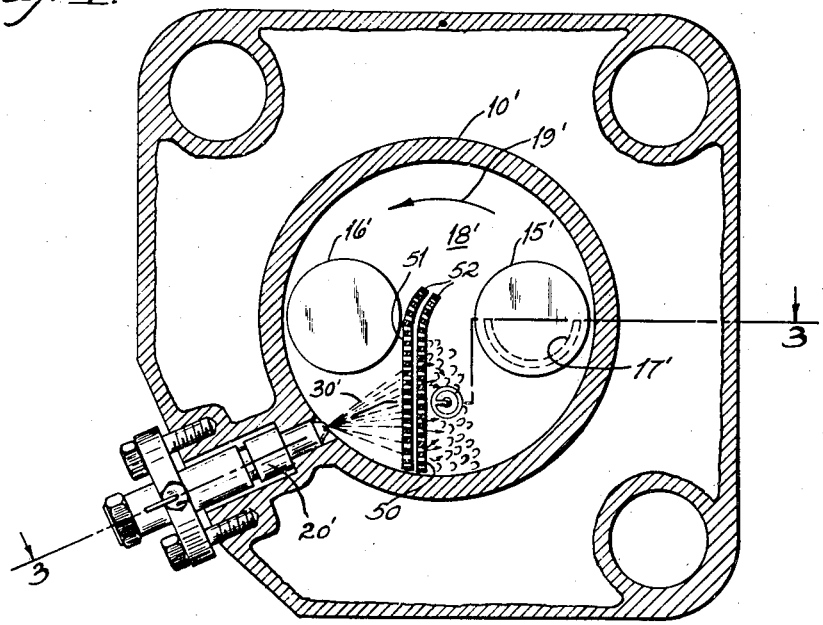

2,483,288

UNITED STATES PATENT OFFICE 2,483,288

INTERNAL-COMBUSTION ENGINE

Jay B. Malin, Fishkill, N. Y., assignor to The Texas Company, New York, N. Y., a corporation of Delaware Application April 10, 1947, Serial No. 740,539

8 Claims. (Cl. 123—32)

This invention relates to a fuel-injection spark-ignition internal combustion engine, wherein the combustion phase is independent of the spontaneous ignition quality of the fuel employed, and knocking of the engine is prevented.

In the copending application of Everett M. Barber, Serial No.10,598 filed February 25, 1948, as a continuation-in-part of Serial No. 513,232, filed December 7, 1943, now abandoned there is disclosed and claimed an engine of this character wherein fuel is injected into rapidly swirling compressed air in the cylinder combustion space toward the latter part of the compression stroke, the first increment of injected fuel is spark-ignited substantially as soon as combustible fuel vapor-air mixture is formed therefrom to establish a flame front traveling counter to the direction of the air swirl, and the injection of fuel is continued into the swirling compressed air immediately in advance of the traveling flame front to progressively form additional combustible fuel vapor-air mixtures which are ignited by the traveling flame front and burned substantially as rapidly as formed. In a specific embodiment disclosed and claimed therein, fuel is injected tangentially into the combustion space in the direction of air swirl, and spark ignition of the first increment of injected fuel is secured by a spark plug mounted adjacent the injection nozzle and close to the periphery of the combustion space so as to be positioned at an edge of the spray form and in region of diffusing fuel vapor-air mixture first produced therefrom.

In the operation of the engine of said prior application, the velocity of air swirl present within the disc-shaped combustion space during the fuel injection period is coordinated with the velocity of flame propagation or travel of the flame front counter to the direction of air swirl so that the flame front remains at a relatively fixed location with respect to the cylinder wall, which location is adjacent the locus of ignition. This coordination is accomplished by regulating the velocity of air swirl so as to be approximately equal to the velocity of flame propagation, or by having the velocity of air swirl somewhat less than the normal velocity of flame propagation through a mass of preformed combustible fuel vapor-air mixture. In the latter case, the normal velocity of flame propagation is then impeded as it tends to move toward the nozzle tip or locus of fuel injection due to incomplete mixing of the fuel spray with the swirling air. A practical upper limit for the velocity of air swirl is thus represented by the former case where the air swirl velocity substantially equals the velocity of flame propagation. If the air swirl velocity exceeds the velocity of flame propagation, then the formed flame front tends to lose ground and move away from the locus of fuel injection. This practical upper limit is determined for each engine by that velocity of air swirl which causes the flame front to recede far enough from the locus of fuel injection during the injection period as to result in the accumulation of sufficient unburned combustible mixture in advance of the flame front to produce knocking of the engine.

In certain instances, it is desirable to utilize higher air-swirl velocities, since that enables the combustion phase of the cycle to be completed in a shorter time. Moreover, where the velocity of air swirl somewhat exceeds the velocity of normal flame propagation, the flame front is prevented from creeping toward the nozzle, whereby adequate mixing of the injected fuel with the swirling air and efficient combustion are assured.

It is accordingly a principal object of the present invention to provide an engine of the foregoing non-knocking combustion type, and a method of operating said engine, whereby higher air-swirl velocities may be employed while still insuring that the flame front does not lose ground and is maintained adjacent the locus of ignition during the injection period of each cycle.

It is a further object of the present invention to induce localized turbulence in the swirling mass in the combustion space of an engine of this character between the locus of fuel injection and the locus of ignition in the direction of air swirl to increase the rate of combustion and at the same time reform the flame front at its original location adjacent the locus of ignition.

Other objects and advantages of the present invention will be apparent from the following description when taken in conjunction with the appended claims and attached drawing.

The present invention is distinguished from the foregoing application by the provision of mechanical means for inducing localized turbulence in the swirling compressed mass within the combustion space during the injection period, said turbulence being induced between the locus of injection and the locus of ignition or the initially established flame front and, preferably closely adjacent the latter. It is further distinguished by the provision of air-swirl velocities which normally exceed the velocity of travel of the flame front under normal conditions of flow of the swirling mass, coupled with the inducing of sufficient turbulence in the localized zone mentioned above to prevent the flame front from losing ground and moving away from the locus of ignition during the injection period. This is accomplished by the provision of a localized turbulence-producing constriction within one side of the combustion space when the piston approaches top dead center, the constriction extending generally radially of the combustion space between the fuel injection nozzle and the spark plug and closely adjacent the latter.

In a preferred embodiment of the invention the constriction is formed by opposed stepped projections on the cylinder head and piston respectively. In another embodiment of the invention, foraminous baffles are carried by the piston and cylinder head in the location stated.

The invention is more particularly illustrated in the attached drawing, wherein:

Fig. 1 is a vertical sectional view of an engine cylinder taken on the plane of the line 1—1 of Fig. 2, with appurtenances illustrated diagrammatically and primarily in elevation;

Fig. 2 is a horizontal sectional view looking upwardly on the cylinder head and taken on the plane of the line 2—2 of Fig. 1;

Fig. 3 is a view similar to Fig. 1 of a modification, and taken on the plane of the line 3—3 of Fig. 4;

Fig. 4 is a view similar to Fig. 2 of the modification and taken on the plane of the line 4—4 of Fig. 3;

Fig. 5 is an enlarged perspective view, partially broken away and in section, of a modified foraminous baffle which can be utilized in Figs. 3 and 4; and Fig. 6 is a detail view of the spiral criss-cross wires or strips of the foraminous baffle of Fig. 5.

Referring to Figs. 1 and 2, the engine cylinder is indicated at 10, with piston 11 and connecting rod 12, which runs to the usual crankshaft, not shown. The cylinder head 13 is formed with an air intake port 14 controlled by intake valve 15, and an exhaust port controlled by exhaust valve 16. The intake valve 15 is equipped with a shroud 17 set tangentially so that, on the suction stroke of piston 11, air is drawn into the disc-shaped combustion space 18 in a manner to impart a swirling movement of high velocity to this air within the combustion space, as indicated by the arrow 19 (Fig. 2). This high velocity air swirl is maintained during the compression stroke of piston 11.

Generally about 25–75° before top dead center, injection of fuel is initiated from injection nozzle 20 directed tangentially of the combustion space in the direction of air swirl. Fuel injection is controlled by fuel pump 21 having a plunger 22 operated by cam 23 on a camshaft 24 which is driven in synchronism with the engine at ½ engine speed for 4-cycle operation in conventional manner. It will be understood that fuel pump 21 controls the time and duration of injection by supplying the fuel under high pressure to injection line 25 leading to nozzle 20 during the pumping stroke of plunger 22; and that the latter controls communication of a feed port supplied with fuel from line 26 leading from a suitable source of supply (not shown) with either a discharge port communicating with line 25 or a spill port which returns the fuel to the source of supply. It will be further understood that nozzle 20 is equipped with a suitable pintle or other type of spring-pressed valve which is opened for fuel injection by the high pressure of fuel in line 25 during the pumping stroke of plunger 22 and is immediately closed by the compression spring when plunger 22 uncovers the spill port which causes a drop in pressure in injection line 25.

Nozzle 20 produces during the injection period a jet or spray indicated at 30 which, as shown more particularly in Fig. 2, is located closer to the periphery at one side of the combustion space 18. The outer edge of the jet extends along a chord of the combustion space closely adjacent the cylinder wall, while the inner or upstream side of the jet is substantially spaced from the center of the combustion space. Nozzle 20 is positioned somewhat below the lower side of cylinder head 13 and about an equal distance from the top dead center position of the piston indicated by the dotted line 31 in Fig. 1. The piston is shown in full lines in Fig. 1 in the position it occupies at about 60° before top dead center of the compression stroke.

Spark plug 34 is mounted in the head 13 so that the electrodes 35 lie closely adjacent an upper edge of the spray 30 although out of direct contact with that spray. As shown more clearly in Fig. 2, the spark plug is positioned closely adjacent nozzle 20 on the air-downstream side thereof so as to be contacted by the diffusing fuel vapor-air mixture formed from the first increment of injected fuel. The angle formed by radii passing respectively through the tip of nozzle 20 and the electrodes 35 of spark plug 34 is within the range of 20–75°, with 30–60° being preferred. While the spark plug is shown as mounted in the head with the electrodes adjacent the upper side of the spray, it is to be understood that the plug can be mounted in the cylinder wall with the electrodes adjacent an outer side of the spray.

Spark plug 34 is provided with an electrical lead 36 extending to a contact 37 of a suitable distributor 38 having a rotary member 39 driven in synchronism with the engine. It will be understood that the distributor 38 is part of a conventional ignition system including lead 40, whereby the timing of ignition can be synchronized with the fuel injection of each cycle. In the particular arrangement shown, a spark of igniting intensity is present at the electrodes 35 approximately 4–10 crank angle degrees following the start of fuel injection, at which time combustible fuel vapor-air mixture from the first increment of injected fuel reaches the electrodes.

In accordance with the present invention, the cylinder head 13 is formed with an offset or step projection 42. As shown more particularly in Fig. 2, the vertical edge of this step projection 42 extends radially across one side of the combustion space 18 intermediate the nozzle tip and the spark plug in the direction of air swirl. This step projection is formed with a semi-circular offset 43 which receives the lower end of the spark plug 34. It will be noted from Fig. 1 that the electrodes 35 protrude slightly below the lower edge of this offset so as to be exposed to the fringe of combustible fuel-air mixture formed from the spray 30. However, the electrodes may be mounted behind the stepped projection so as to be partially shielded from the spray, the eddy currents being relied upon to carry the mixture into contact with the electrodes. The piston 11 is also formed with an opposed step projection 44 extending radially and lying directly opposite step projection 42 on the cylinder head. As indicated in Fig. 1, the upper surface of the piston may be formed with a spiral incline 45 to conveniently produce the step projection 44.

As the piston approaches its upper dead center position, such as the positions intermediate those shown in full and dotted lines in Fig. 1, the opposed stepped projections on the cylinder head and piston respectively effect a substantial reduction in the vertical cross-sectional area of that portion of the combustion space intermediate the locus of fuel injection and the locus of ignition. This increases the velocity of swirl of the compressed air being impregnated with fuel in this zone. Immediately upon reaching the locus of ignition of spark plug 34, the effective vertical cross-sectional area of the combustion space is suddenly enlarged. This produces substantial turbulence in the swirl, with resulting eddy currents adjacent the upper surface of the piston as indicated by the arrows 47 and adjacent the surface of the cylinder head as indicated by the arrows 48.

It will be appreciated that the first increment of injected fuel will be ignited by the electrodes 35 substantially as soon as combustible fuel vapor-air mixture has been formed therefrom to produce a flame front indicated at 49 (Fig. 2). Thereafter, injection of fuel is continued from nozzle 20 by jet 30 into the swirling air in advance of this flame front 49 which is travelling counter to the direction of air swirl. It is desirable that the flame front 49 be maintained in substantially fixed relation to the cylinder wall at its original location adjacent the locus of ignition, so that the progressively formed increments of combustible mixture during the remainder of the injection period will be consumed by combustion substantially as rapidly as produced. Where the velocity of air swirl in the combustion space during the injection period exceeds the normal velocity of flame propagation, the flame front 49 tends to lose ground and to swing around the combustion space from its original location toward valve 15 (Fig. 2) and even beyond. With the present construction, however, the eddy currents 47 and 48, which are composed of flaming portions of the mixture, tend to return pieces of flame to the original location of the flame front, and this flame re-ignites fresh combustible mixture and reforms the flame front 49 adjacent to its original location. The net result is that the flame front 49 is maintained adjacent to the locus of ignition throughout the injection period, even though the velocity of air swirl exceeds the normal velocity of flame propagation in customary flow, and knocking of the engine is prevented.

Figs. 3 and 4 are views similar to Figs. 1 and 2 of a modification, wherein similar primed reference numerals indicate like parts. In this modification, the cylinder head and piston are formed with conventional flat or crowned surfaces; and the piston 11' carries an upstanding screen baffle 50; while the head 13' carries a cooperating depending baffle 51. As shown more particularly in Fig. 4, the baffles extend generally parallel with a radius of the combustion space containing electrodes 35', except that the inner ends of the baffles indicated at 52 are slightly curved beyond the center of the combustion space to prevent the swirling air from bypassing the baffles. Here again the baffles extend generally radially across one side of the combustion space intermediate the locus of the fuel injection and the locus of ignition. As shown, the baffle 51 is located in advance of baffle 50 with a small clearance therebetween, although this can be altered. The baffle 51 is shown as integral with the head 13', with the baffle 52 integral with piston 11'. Each of baffles 51 and 52 is formed as a checkerwork, with squares or rectangles of metal alternating in both horizontal and vertical directions with openings or air-flow passages, the latter being larger in cross-sectional area than the former.

Fig. 5 discloses a modified type of insert baffle which can be fastened, as by welding, to the piston with another similar baffle fastened to the head in the embodiment of Figs. 3 and 4, in place of the integral type of baffles shown therein. Fig. 5 is a perspective view approximately twice the actual size of this baffle for a cylinder having a 3¼" diameter bore. This baffle comprises a peripheral frame 53 to which is fastened a series of criss-cross metal strips 54. For convenience in illustration, the criss-cross strips ar shown in smaller width or diameter, as well as in fewer number, than are used to produce the desired effective turbulence, while still not unduly dampening the air swirl. Moreover, the baffle is shown as being straight or flat, although it will be understood that the inner end thereof can be curved as in Figs. 3 and 4.

Fig. 6 is a detailed view illustrating one manner in which the metal strips of Fig. 5 are fashioned. As shown, each of the strips can be constructed from a flat metal strap which is twisted at spaced intervals into a spiral. The flat surfaces of the straps overlap and may be joined as indicated at 55, while the intermediate portions receive the spiral or twist indicated at 56 which promotes increased turbulence of the swirling mass. While the spiral construction illustrated represents a convenient embodiment, it will be understood that any suitable construction wherein the intermediate portions of the criss-cross straps are inclined at different angles can be employed. Moreover, in place of the metal straps, the cross-cross members can be formed from metal rods which are flattened at various angular inclinations intermediate their overlapping portions. While this construction promotes extra turbulence in the swirling mass, simple untwisted straps or circular rods or wires can be employed with good results, provided the criss-cross members are sufficiently numerous and close together to produce the effect of a foraminous screen providing a localized restriction in the flow area.

In addition to the constructions described above, the baffles can be constructed of wire mesh screens, perforated plates designed with large flow area, or by a series of pins or rods that mesh or are staggered in close juxtaposition as the piston approaches its top dead center position.

The piston 11' is shown in Fig. 3 at its upper dead center position, at which time fuel injection may have been completed or largely completed. In this position, the baffles overlap their maximum extent. The height of each of the baffles is coordinated with the available space remaining in the combustion chamber 18' at the end of the compression stroke, which in turn depends upon the compression ratio, so that the initial overlap of the baffles takes place about the beginning of fuel injection on the compression stroke. It will be appreciated that the baffles have little influence on the air swirl until this overlap occurs during the injection period. In this manner, the desired high velocity of air swirl is effectively maintained, while at the same time the mechanically induced turbulence becomes effective during the injection period and increases as injection is continued on each cycle. This turbulence effectively reforms the flame front adjacent the locus of ignition in the manner previously described. Moreover, effective turbulence in the swirling mass immediately prior to reaching the flame front promotes rapid and efficient combustion.

While the construction illustrated, with cooperating baffles carried by both the piston and cylinder head, constitutes a preferred embodiment, it should be mentioned that this is not essential. Thus a single baffle, either carried by the piston or by the cylinder head, will produce effective turbulence including the desired eddy currents for reforming the flame front as the piston approaches its upper position during the injection period. It will be understood that any of the various forms of baffles are designed with large flow area so that the air swirl velocity is not objectionably dampened while at the same time effective turbulence is produced. The expression "foraminous baffle" is used herein to designate any of the forms of upstanding projections or baffles described above, including the intermeshing or staggered pins or rods.

By way of example, a CFR cylinder of 3¼" diameter bore equipped with an intake valve 15 having 180° shroud 17 set tangentially is capable of inducing an air swirl velocity of roughly about 6 revolutions per engine R. P. M., which means a complete rotation of the swirling mass in the combustion space in 60 crank angle degrees. The velocity of flame propagation through preformed combustible mixture having normal flow is roughly about 12 to 8 revolutions per R. P. M., equivalent to about 30-45 crank angle degrees. However, as pointed out above, the velocity of flame propagation counter to the direction of air swirl in the previous engines of this type is reduced as the flame front approaches the locus of injection, so that the flame front generally assumes a relatively fixed position with respect to the cylinder wall. In accordance with the present invention, the air swirl velocity is increased in known manner by increasing the extent of the shroud coupled with supercharging, whereby velocities up to about 17 revolutions per R. P. M. are obtained. At the same time the localized turbulence producing constriction increases the rate of combustion, and the induced eddy currents carrying flaming particles reform the flame front to prevent the latter from losing ground and receding from the locus of injection. The net result is that the flame front is maintained sufficiently close to its initial zone of formation that knocking is prevented during injection and combustion on each cycle.

Obviously many modifications and variations of the invention, as hereinbefore set forth, may be made without departing from the spirit and scope thereof, and therefore only such limitations should be imposed as are indicated in the appended claims.

What I claim is:

1. In the operation of an internal combustion engine, wherein fuel is injected into rapidly swirling compressed air in the cylinder combustion space toward the latter part of the compression stroke, the first increment of injected fuel is spark-ignited substantially as soon as combustible fuel vapor-air mixture is formed therefrom to establish a flame front traveling counter to the direction of air swirl, and the injection of fuel is continued into the swirling compressed air immediately in advance of the traveling flame front to progressively form additional combustible fuel vapor-air mixtures which are ignited by the traveling flame front and burned substantially as rapidly as formed; the improvement which comprises mechanically inducing turbulence of the swirling compressed air containing injected fuel in the said combustion space between the locus of injection and the locus of the initially established flame front and closely adjacent the locus of the latter to prevent the flame front from receding far enough from the locus of fuel injection during said combustion as to result in the accumulation of sufficient unburned combustible mixture in advance of the flame front to produce knocking of the engine.

2. The method according to claim 1, wherein the velocity of air swirl normally exceeds the velocity of travel of said flame front under conditions of normal flow of said swirling mass, so that said flame front would tend to lose ground and move away from the locus of ignition, and the induced turbulence is sufficient to maintain said flame front substantially at the locus of ignition.

3. In an internal combustion engine having a power cylinder and cylinder head with piston operating therein providing a disc-shaped combustion space, air intake means for said cylinder adapted to introduce air into said combustion space and impart a high velocity of swirling movement therein, a fuel injection nozzle mounted to inject a fuel spray into one side of said combustion space, in a manner to impregnate the compressed air swirling past said locus of fuel injection, means synchronized with engine operation for supplying fuel to said nozzle toward the latter part of the compression stroke of said piston at a temperature and pressure such that at least a portion of the first increment of injected fuel vaporizes rapidly and forms with a localized portion of the swirling air a combustible fuel vapor-air mixture with only a short travel of the fuel from the nozzle, a spark plug carried by said cylinder closely adjacent said nozzle on the air downstream side thereof having electrodes positioned immediately adjacent the edge of the spray so as to be out of the direct path of the spray, but within the region of diffused fuel vapor-air mixture from the first increment of injected fuel of said spray, and means synchronized with engine operation for producing a spark of ignitible intensity at said electrodes at the time said combustible fuel vapor-air mixture from the first increment of injected fuel contacts said electrodes to thereby establish a flame front traveling counter to the direction of air swirl, with fuel injection being continued immediately in advance of said traveling flame front; the improvement which comprises, in combination, a localized turbulence producing constriction positioned at one side of said combustion space between the said cylinder head and piston, and arranged to promote turbulence of the swirling mass within said side of the combustion space as the said piston approaches its top dead center position on the compression stroke, said constriction extending generally radially of the combustion space intermediate said fuel injection nozzle and said spark plug in the direction of air swirl and closely adjacent said spark plug to prevent the flame front from receding far enough from the locus of fuel injection during said combustion as to result in the accumulation of sufficient unburned combustible mixture in advance of the flame front to produce knocking of the engine.

4. An internal combustion engine according to claim 3, wherein said constriction comprises opposed stepped projections formed on said cylinder head and said piston respectively.

5. An internal combustion engine according to claim 3, wherein said constriction comprises a foraminous baffle.

6. An internal combustion engine according to claim 5, wherein said foraminous baffle comprises criss-cross strips having their flat sides overlapping, with the portions of the strips intermediate their overlapping parts being inclined at different angles.

7. An internal combustion engine according to claim 3, wherein said constriction comprises a foraminous baffle carried by the said piston, and a cooperating foraminous baffle carried by the head, with said baffles overlapping in close juxtaposition during the injection period.

8. An internal combustion engine according to claim 7, wherein the inner ends of said baffles are curved slightly beyond the center of the combustion space to inhibit by-passing of the swirling mass around the inner ends of the baffles.

JAY B. MALIN.

REFERENCES CITED

The following references are of record in the file of this patent:

UNITED STATES PATENTS

| Number | Name | Date |
|---|---|---|
| 2,026,321 | Quick | Dec. 31, 1935 |
| 2,199,739 | Burke | May 7, 1940 |
| 2,256,776 | Kammer | Sept. 23, 1941 |